United States Patent [19]

Okagami et al.

[11] 4,000,987

[45] Jan. 4, 1977

[54] LOW-TEMPERATURE STEAM REFORMING PROCESS FOR HYDROCARBONS

[75] Inventors: Akio Okagami, Fuchu; Kunihiko Uemoto, Yokohama; Kouichi Satoh, Noganei, all of Japan

[73] Assignees: Japan Gasoline Co., Ltd.; Nikki Chemical Co., Ltd., both of Tokyo, Japan

[22] Filed: Apr. 2, 1975

[21] Appl. No.: 564,303

Related U.S. Application Data

[63] Continuation of Ser. No. 430,711, Jan. 4, 1974, abandoned.

[30] Foreign Application Priority Data

Feb. 3, 1973 Japan .......................... 48-013961

[52] U.S. Cl. .......................... 48/214 A; 252/373; 252/443; 252/457; 252/465
[51] Int. Cl.² ........................ C10G 11/28; C01B 2/16
[58] Field of Search ......... 48/214 A; 252/373, 473, 252/443, 457, 465, 466 J; 423/654

[56] References Cited

UNITED STATES PATENTS

| 3,429,680 | 2/1969 | Watanabe et al. | 48/214 |
| 3,567,411 | 3/1971 | McMahon | 48/214 |
| 3,744,981 | 7/1973 | Ward | 48/214 |

*Primary Examiner*—S. Leon Bashore
*Assistant Examiner*—Peter F. Kratz
*Attorney, Agent, or Firm*—Woodhams, Blanchard and Flynn

[57] ABSTRACT

A process of manufacturing a methane-containing gas, which comprises introducing a hydrocarbon feed material containing hydrocarbons having at least 2 carbon atoms per molecule and steam preheated to a temperature in the range of 250°–600° C into a steam reforming reactor (or reactors) packed with a nickel-containing catalyst comprising nickel and magnesia and further containing a copper-chromium mixture in the form of oxide or a copper-chromium-manganese mixture in the form of oxide and effecting steam reforming reaction of said hydrocarbons while maintaining the temperature of the catalyst bed of said reactor(s) in the range of 300° to 600° C.

10 Claims, 7 Drawing Figures

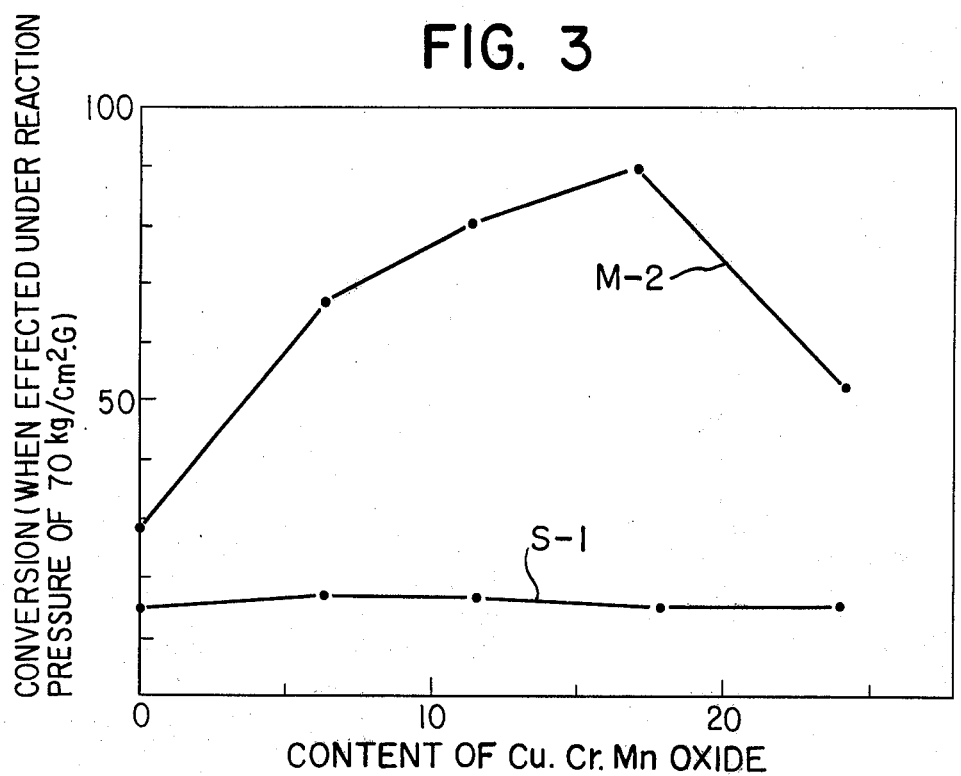
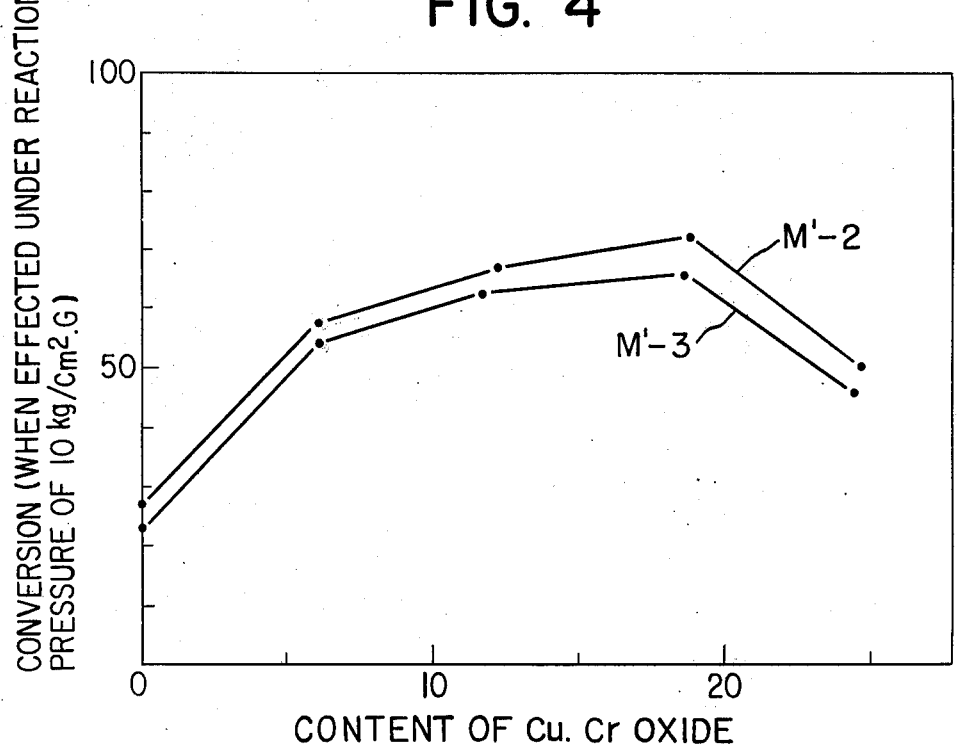

LOW-TEMPERATURE STEAM REFORMING PROCESS FOR HYDROCARBONS

This is a continuation of application Ser. No. 430,711 filed Jan. 4, 1974, and now abandoned.

BACKGROUND OF THE INVENTION

1. Field of the Invention

The present invention relates to a process of catalytic steam reforming of hydrocarbons having at least 2 carbon atoms per molecule at a temperature in the range of 300° to 600° C, and to be more precise, it relates to a process of manufacturing a methane-rich gas as the typical product thereof by, for instance, adiabatically steam reforming the hydrocarbon feed material in the presence of a special catalyst capable of demonstrating superior effects particularly in the low-temperature steam reforming of material hydrocarbons containing sulfur compounds.

2. Description of the Prior Art

There have hitherto been proposed a variety of processes of manufacturing a methane-containing gas by subjecting such hydrocarbon feed material as above to low-temperature steam reforming in the presence of a nickel-containing catalyst. To cite instances, there are Japanese Pat. No. 11047/1965 teaching the employment of a catalyst consisting of nickel-alumina-lanthanide, Japanese Pat. No. 11048/1965 teaching the employment of a catalyst consisting of nickel-alumina-iron, Japenese Pat. No. 17737/1969 teaching the employment of a catalyst consisting of nickel-alumina-alkaline earth metal, Japanese pat. No. 19174/1970 teaching the employment of a catalyst consisting of nickel-alumina-aluminium, and so on.

However, these conventional catalysts are more or less apt to give rise to deterioration of the quality when used for a long time — particularly under the condition of high pressure — and also deposition of carbonaceous matters, so that the conventional processes employing these catalysts have shown a tendency of having difficulty in maintaining a low-temperature steam reforming operation over a long period of time. Moreover, inasmuch as the conventional nickel-containing catalysts are vulnerable to a sulfur-containing contaminant, in the case of treating such hydrocarbon feed material containing relatively significant amount of sulfur compounds, it has been required to subject said material hydrocarbons to a pretreatment process for desulfurization under severe conditions.

SUMMARY OF THE INVENTION

The present invention is intended to provide a process of manufacturing a methane-containing gas, which comprises introducing a hydrocarbon feed material containing hydrocarbons having at least 2 carbon atoms per molecule and steam preheated to a temperature in the range of 250° to 600° C at the ratio of moles of steam to the number of moles of carbon atoms in said feed hydrocarbon in the range of 0.9 to 5.0 into a steam reforming reactor (or reactors) packed with either a nickel-containing catalyst wherein the atomic ratio of nickel to magnesium Ni/Mg is in the range of 0.5 to 5.0 — preferably 1.0 to 3.0 — and a copper-chromium mixture in the form of oxide or a copper-chromium-manganese mixture in the form of oxide, is contained to the extent of less than 25 wt.% relative to the content of nickel in terms of metal; or a nickel-containing catalyst consisting of a catalyst composition as above and further containing an inorganic refractory carrier free of chemical reaction with associated components during the reforming reaction to the extent of less than 70 wt.% relative to the whole amount of the catalyst; and effecting steam reforming reaction of said hydrocarbons under the pressure for reaction in the range of 10 to 100 kg/cm².G while maintaining the temperature of the catalyst bed of said reactor(s) in the range of 300° to 600° C, preferably 400° to 570° C.

BRIEF DESCRIPTION OF THE DRAWING

Referring to the appended drawings,

FIG. 1 –FIG. 7 are graphs illustrative of conversion in the low-temperature steam reforming reaction effected by employing the catalysts of the present invention respectively.

DETAILED DESCRIPTION OF THE INVENTION

Figure 1:
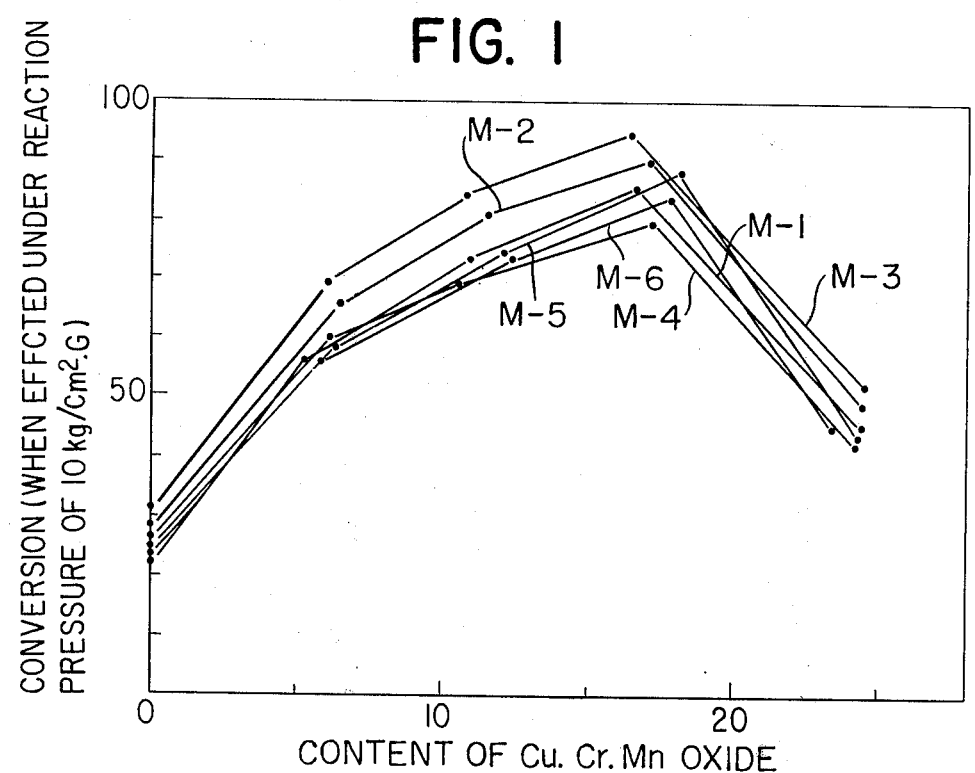

Under the circumstances as stated above, Kiyoshi Morikawa, Akio Furuta and Hideyuki Matsumoto previously proposed in patent application Ser. No. 417,768, filed Nov. 21, 1973, now U.S. Pat. No. 3,928,002, the employment of a novel nickel-magnesia catalyst having the atomic ratio of nickel to magnesium in a specific range and Akio Okagami, Akio Furuta and Toshi Kazu Nakamura proposed in patent application Ser. No. 424,843, filed December 14, 1973, now abandoned and replaced by continuation application Ser. No. 588,309, a nickel-magnesia-carrier catalyst to be prepared by making this novel catalyst composition contain a specific carrier, in lieu of the conventional nickel-containing catalysts.

The present invention is intended to provide a further improved low-temperature steam reforming process for hydrocarbons. In other words, the present invention has been developed on the basis of the finding that a catalyst prepared by mixing an appropriate amount of a copper-chromium oxide or a copper-chromium-manganese oxide with the foregoing nickel-magnesia catalyst is not only possessed of an excellent sulfur resistance but also durable in serving under the condition of high pressure, so that the employment of a catalyst of this kind will render it possible to manufacture a methane-containing gas by low-temperature steam reforming without resorting to desulfurization under exceptionally severe conditions even when feed hydrocarbons containing sulfur compounds are to be treated.

To be precise, the low-temperature steam reforming process according to the present invention is characterized in that, in a process of manufacturing a methane-containing gas by introducing a hydrocarbon feed material containing hydrocarbons having at least 2 carbon atoms per molecule and steam preheated to a temperature in the range of 250° to 600° C into a steam reforming reactor (or reactors) packed with a nickel-containing catalyst and effecting steam reforming of said hydrocarbons while maintaining the temperature of the catalyst bed of said reactor(s) in the range of 300° to 600° C — preferably 400° to 570° C, said nickel-containing catalyst is to be a nickel-containing catalyst wherein the atomic ratio of nickel to magnesium is in the range of 0.5 to 5.0, and a copper-chromium mixture or a copper-chromium-manganese mixture in the form of oxide is also present to the extent of less than 25 wt.% relative to the content of nickel in terms of metal.

To give a further detailed explanation of the present invention, the catalyst for use in the low-temperature steam reforming process under the present invention includes (A) a catalyst prepared by adding to a nickel-magnesia composition having the atomic ratio of nickel to magnesium in the range of 0.5 to 5.0 — preferably 1.0 to 3.0 — a copper-chromium mixture or a copper-chromium-manganese mixture in the form of oxide to the extent of less than 25 wt.% relative to the content of nickel in terms of metal, and (B) a catalyst prepared by mixing the catalyst composition of (A) above with the aforesaid inorganic refractory carrier to the extent of less than 70 wt.% relative to the whole amount of the catalyst. The composition of these catalysts under the present invention can be expressed by Ni—MgO—(Cu—Cr oxide or Cu—Cr—Mn oxide) or Ni—NiO—MgO—(Cu—Cr oxide or Cu—Cr—Mn oxide) as for (A), and Ni—MgO—(Cu—Cr oxide or Cu—Cr—Mn oxide)-(carrier) or Ni—NiO—Mgo—(Cu—Cr oxide or Cu—Cr—Mn oxide)-(carrier) as for (B) when each has been activated. MgO herein is an active magnesia which takes part in the steam reforming reaction. In this case, as the carrier to be contained in said catalyst composition (B), an inorganic refractory carrier free of chemical reaction with associated components, i.e. component and magnesia component, during said reforming reaction is to be employed; and to give concrete examples, $\alpha$-$Al_2O_3$, SiC, $\alpha$-quartz, $ZrO_2$ and the like are applicable. In this connection, $\gamma$-$Al_2O_3$, silica gel, kaolin, etc., widely used as the carrier for use in the conventional catalysts for low-temperature steam reforming reaction are unfit for use as the carrier for the catalysts of the present invention. The composition and the state of oxidation of the foregoing copper-chromium oxide or copper-chromium-manganese oxide to be contained in the catalysts of the present invention are not particularly limited, but, generally speaking, it is desirable that it be in the form of copper chromite, expressed by the structural formula $Cu_2Cr_2O_5$. Manganese is a component capable of furthering the efficiency of the catalyst under the present invention when it co-exists with the copper-chromium component.

The nickel-containing catalyst for low-temperature steam reforming comprising a copper-chromium oxide or a copper-cromium-manganese oxide has already been disclosed in British Pat. No. 1,061,797 However, a sharp distinction can be made between the catalyst under said British patent and that under the present invention, as follows.

That is, to speak of the catalyst efficiency first, as is verified by the examples to be shown later on, the catalyst under the present invention can bring on more satisfactory effects than the catalyst of said British patent even in performing low-temperature steam reforming under the condition of a low pressure for reaction, not to mention steam reforming under the condition of a high pressure for reaction. To speak of the composition of catalyst, the catalyst of the present invention is distinctly different from that of said British patent in that the fundamental component of this invention is a nickel-magnesia composition having the atomic ratio of nickel component to magnesium in a specific range, and further the amount of a copper-chromium oxide or a copper-chromium-manganese oxide to be contained in the catalyst under the present invention is less than 25 wt.% — preferably 10 to 20 wt.% — relative to the content of nickel in terms of metal. In this connection, said British patent teaches the applicability of magnesia as the carrier but does not teach the atomic ratio of nickel component to magnesium. Besides, it defines the amount of a copper-chromium oxide or a copper-chromium-manganese oxide present in the catalyst thereunder to be less than 10 wt.% relative to the nickel component in terms of metal.

The catalyst for reforming for use in the present invention can be manufactured by appropriate methods, of which typical ones are as shown in the following.

1. CO-PRECIPITATION METHOD

An aqueous solution of a nickel salt selected from $Ni(NO_3)_2$, $NiSO_4$, $NiCl_2$, $Ni(CH_3COO)_2$, $Ni(HCOO)_2$ and the like, an queous solution of a magnesium salt selected from $Mg(NO_3)_2$, $MgSO_4$, $MgCl_2$, $Mg(CH_3COO)_2$, $Mg(HCOO)_2$ and the like, and an aqueous solution of an alkali selected from NaOH, KOH, $Na_2CO_3$, $K_2CO_3$ and the like, are admixed in such a maner that the atomic ratio of nickel component to magnesium component for the resulting catalyst is in the range of 0.5 to 5.0 — preferably 1.0 to 3.0 — to the temperature being in the range of 30°–70° C, thereby causing precipitation of a hydroxide or basic carbonate of nickel and magnesium. The mixture liquid is mixed by stirring for appropriate time — for instance, 0.5 to 3 hours — while being held at a temperature as desired, thereby aging said precipitate. The resulting precipitate is filtered and then washed with a large quantity of water or, if desired, hot water. This washing is conducted repeatedly until the washing water after washing becomes practically free of the alkaline matters mixed initially in the form of alkaline aqueous solution, that is, until the pH value comes to be in the range of 7 to 9. The thus obtained precipitate is next mixed with, for instance, an ammonium double salt containing copper and chromium at the atomic ratio of 1:1 (or copper, chromium and manganese at the atomic ratio of 1:1:0.1) or an oxide thereof in such a manner that the amount of said ammonium double salt or oxide is less than 25 wt.% in terms of metal content thereof relative to the content of nickel. Subsequently, the resulting mixture is dried at a temperature in the range of 40° to 130° C mixed with less than 10 wt.% of an appropriate molding assistant such as graphite, stearic acid, etc. and molded into 1 to 10 mesh tablets by means of a tablet machine. This tablet is calcined at a temperature in the range of 300° to 800° C preferably 400°–700° C, whereby a catalyst for use in the present invention is produced. In the case where a carrier-supported catalyst is desired, it can be obtained by adding the above described special carrier (grain size: less than 200 meshes) in the amount of less than 70 wt.% relative to the whole amount of the catalyst to the foregoing liquid mixture wherein precipitation is to be effected and applying the same procedures as in the foregoing thereafter.

2. DEPOSITION METHOD

A commercial active magnesia powder for industrial use, the same nickel salt, and alkaline aqueous solution as those employed for the foregoing co-precipitation method [1] are admixed under the condition of the temperature beng in the range of from room temperature to 90° C — preferably 30° to 70° C — upon regulating the atomic ratio of nickel component to magnesium component for the catalyst to be in the range of 0.5 to 5.0, preferably 1.0 to 3.0, thereby causing to precipitation of a hydroxide or basic carbonate of nickel on the surface of said magnesia. The thus deposited precipitate is then mixed with a prescribed amount of said ammonium double salt or oxide employed in the foregoing co-precipitation method, and the resulting mixture is subjected to the same treatment as in the case of the co-precipiration method thereafter, whereby a catalyst for use in the present invention is prepared. In the case where a carrier-supported catalyst is desired, it can be produced by adding a prescribed amount of a prescribed carrier to the foregoing precipitate after filtration and washing.

3. MIXING METHOD

The same nickel salt and alkaline aqueous solution as defined in the foregoing co-precipitation method are admixed under the condition of the temperature being in the range of from room temperature to 90° C, preferably 30° to 70° C thereby causing precipitation of a hydroxide or basic carbonate of nickel. This precipitate is then subjected to aging, filtration and washing in the same way as in the co-precipitation method. The thus obtained precipitate is uniformly mixed upon adding thereto a commercial active magnesia powder for industrial use in such a manner that the atomic ratio of nickel component to magnesium component for the resulting catalyst comes within the prescribed range. Subsequently, this mixture is mixed with a prescribed amount of said ammonium double salt or oxide employed in the foregoing co-precipitation method and is subjected to the same treatment as in the case of the co-precipitation method thereafter, whereby a catalyst for use in the present invention is prepared. In the case where a carrier-supported catalyst is desired, it can be produced by adding a prescribed carrier to the foregoing mixture of precipitate and magnesia powder and applying the ame procedures as in the foregoing thereafter.

The characteristic features of the catalyst under the present invention and the method of manufacturing thereof are as explained hereinbefore, and the low-temperature steam reforming process according to the present invention is to be started when such a special catalyst as above is packed in a steam reforming reactor (or reactors) and is activated by feeding hydrogen as the reducing gas at a temperature in the range of 300° to 600° C — preferably 400° to 500° C — thereto. When said catalyst has been perfectly activated, feeding of hydrogen is discontinued, a mixture of said hydrocarbon feed material and steam preheated to a temperature in the range of 250° to 600° C is introduced into said ractor(s). As the hydrocarbon feed material for use on this occasion, such ones having at least 2 carbon atoms per molecule are applicable, and they may comprise sulfur compounds to the extent of about 10 ppm — preferably less than 5 ppm. Typical material hydrocarbons are the refinery off gas, liquefied petroleum gas (LPG), light naphtha, heavy naphtha, kerosene and the like. The ratio of steam to be mixed with the feed hydrocarbons in the present invention desirably is in the range of 0.9 –5.0 in terms of $H_2O/C$ (that is, the number of moles of steam to the number of moles of carbon atoms of the material hydrocarbons). As for the cnditions for the reforming reaction, the applicable temperature of the catalyst bed is generally in the range of 300° to 600° c, preferably 400° to 570° C, and the applicable pressure for reaction is in the range of 10 to 100 $Kg/cm^2 \cdot G$. but the low-temperature steam reforming process according to the present invention produces satisfactory effects particularly under the condition of a high pressure in the range of 30–100 $kg/cm^2 \cdot G$.

The product gas obtained by the low-temperature steam reforming process of the present invention usually contains more than 40% of methane on a dry basic coupled with such associated components as hydrogen, carbon monoxide and carbon dioxide. Therefore, this methane-containing gas not only is suited for use as the fuel gas as it is, but also renders it possible to manufacture a gas containing much more methane than above by effecting methanation reaction of carbon oxides by feeding said product gas to a methanation reactor(s).

DESCRIPTION OF THE PREFERRED EMBODIMENTS

Hereunder will be given further particulars of the present invention by reference to preferred embodiments of the present invention.

First of all, 35 varieties of nickel-containing catalysts for use in Examples 1 – 3 were manufactured under the conditions for manufacturing shown in Table-1 below. In this Table-1, 20 varieties of catalysts in all belonging to the groups of catalysts M-1, M-2, M-3 and M-4 are catalysts manufactured by the aforesaid method [1], 5 varieties of catalysts belonging to the group M-5 are catalysts manufactured by the method [2] and 5 varieties of catalysts belonging to the group M-6 are catalysts manufactured by the method [3]. On the other hand, 5 varieties of catalysts belonging to the group S-1 for the purpose of comparison with the catalysts according to the present invention are catalysts manufactured according to the conventional method by suspending silica gel as the carrier component in an aqueous solution of nickel salt and magnesium salt such as shown in Table-1. In this connection, the content of copper-chromium-manganese oxide and the atomic ratio of Ni/Mg in said table represent the content of said oxide and the atomic ratio of Ni/Mg, respectively, in the resulting catalyst.

Table 1

| Symbol for catalyst | Condition for manufacturing | content of copper-chromium-manganese oxide (Cu:Cr:Mn= 1:1:0.1) (wt.%) | atomic ratio of Ni/Mg | nickel salt (gr) | magnesium salt (gr) | alkaline salt (gr) | carrier component (gr) | amount of water required for overall resolution (l) | temperature for calcination (° C) |
|---|---|---|---|---|---|---|---|---|---|
| M-1 | a | 0 | | $Ni(NO_3)_2 \cdot 6H_2O$ | $Mg(NO_3)_2 \cdot 6H_2O$ | $Na_2CO_2$ | | | |
| | b | 6 | | | | | | | |
| | c | 11 | 0.6 | 300 | 440 | 300 | | 6.5 | 350 |
| | d | 17 | | | | | | | |
| | e | 25 | | | | | | | |

Table 1-continued

| Symbol for catalyst | Condition for manufacturing | content of copper-chromium-manganese oxide (Cu:Cr:Mn= 1:1:0.1) (wt.%) | atomic ratio of Ni/Mg | nickel salt (gr) | magnesium salt (gr) | alkaline salt (gr) | carrier component (gr) | amount of water required for overall resolution (l) | temperature for calcination (° C) |
|---|---|---|---|---|---|---|---|---|---|
| M-2 | a | 0 | | Ni(NO₃)₂.6H₂O | Mg(NO₃)₂.6H₂O | Na₂CO₃ | | | |
|  | b | 6 | | | | | | | |
|  | c | 11 | 1.7 | 485 | 250 | 350 | | 7 | 350 |
|  | d | 17 | | | | | | | |
|  | e | 25 | | | | | | | |
| M-3 | a | 0 | | Ni(NO₃)₂.6H₂O | Mg(NO₃)₂.6H₂O | Na₂CO₃ | | | |
|  | b | 6 | | | | | | | |
|  | c | 11 | 3.0 | 555 | 157 | 350 | | 7 | 350 |
|  | d | 17 | | | | | | | |
|  | e | 25 | | | | | | | |
| M-4 | a | 0 | | Ni(NO₃)₂.6H₂O | Mg(NO₃)₂.6H₂O | Na₂CO₃ | | | |
|  | b | 6 | | | | | | | |
|  | c | 11 | 4.6 | 560 | 110 | 300 | | 7 | 350 |
|  | d | 17 | | | | | | | |
|  | e | 25 | | | | | | | |
| M-5 | a | 0 | | NiSO₄.6H₂O | MgO | Na₂CO₃ | | | |
|  | b | 5 | | | | | | | |
|  | c | 12 | 1.7 | 290 | 30 | 200 | | 3 | 350 |
|  | d | 18 | | | | | | | |
|  | e | 25 | | | | | | | |
| M-6 | a | 0 | | NiSO₄.6H₂O | MgO | Na₂CO₃ | | | |
|  | b | 5 | | | | | | | |
|  | c | 12 | 1.7 | 290 | 30 | 200 | | 3 | 350 |
|  | d | 18 | | | | | | | |
|  | e | 25 | | | | | | | |
| S-1 | a | 0 | | Ni(NO₃)₂.6H₂O | Mg(NO₃)₂.6H₂O | Na₂CO₃ | silica gel | | |
|  | b | 6 | | | | | | | |
|  | c | 11 | 1.7 | 290 | 150 | 400 | 27 | 6 | 350 |
|  | d | 17 | | | | | | | |
|  | e | 25 | | | | | | | |

EXAMPLE 1.

This example is to illustrate the effects of the presence of said copper-chromium-manganese oxide in the catalyst under the present invention.

25 gr each of 30 varieties of catalysts belonging to the groups M-1, M-2, M-3, M-4, M-5 and M-6 in Table-1 were packed in separate reforming reactors and subjected to reduction treatment with hydrogen gas stream at 500° C for about 12 hours. Subsequent to reduction of the catalyst, by introducing naphtha feed material having 6.09 carbon atoms in average per molecule, IBP of 33° C, EBP of 122° C, specific gravity of $d_4^{15}$ 0.675 and sulfur content of 15 ppm at the rate of 80 gr/hr into said reactors together with steam by setting the ratio of $H_2O/C$ (mole/atom) at 2.0, the steam reforming reaction was continuously effected for 200 hours under the condition that 500° C temperature for the reaction and 10 Kg/cm²·G pressure for the reaction.

The relation between the content of copper-chromium-manganese oxide and the conversion in the case of the catalysts belonging to said groups M-1 through M-6 on this occasion was as shown in FIG. 1, rspectively. Further, when the amount of the deposited carbon was measured in respect of each catalyst belonging to the groups M-1, M-2, M-3 and M-4 after reforming reaction, the result was as shown in Table-2 below.

Table-2

| Symbol for catalyst | M-1 | | | | | M-2 | | | | |
|---|---|---|---|---|---|---|---|---|---|---|
|  | a | b | c | d | e | a | b | c | d | e |
| Content of copper-chromium-manganese oxide (the bracketed represents actually measured value) (wt.%) | 0 (0.0) | 6 (6.1) | 11 (10.8) | 17 (16.4) | 25 (24.2) | 0 (0.0) | 6 (6.3) | 11 (11.3) | 17 (17.0) | 25 (24.1) |
| Amount of carbon (gr) | 0.05 | 0.00 | 0.00 | 0.00 | 0.00 | 0.05 | 0.00 | 0.00 | 0.00 | 0.00 |

| Symbol for catalyst | M-3 | | | | | M-4 | | | | |
|---|---|---|---|---|---|---|---|---|---|---|
|  | a | b | c | d | e | a | b | c | d | e |
| Content of copper-chromium-manganese oxide (the bracketed represents actually measured value) (wt.%) | 0 (0.0) | 6 (5.9) | 11 (11.5) | 17 (16.2) | 25 (24.4) | 0 (0.0) | 6 (5.2) | 11 (10.3) | 17 (17.1) | 25 (24.0) |
| Amount of carbon | 0.08 | 0.00 | 0.00 | 0.00 | 0.00 | 0.10 | 0.00 | 0.00 | 0.00 | 0.00 |

Table-2-continued

As is clear from FIG. 1, the catalysts under the present invention make possible satisfactory effects in steam reforming reaction no matter what the method of manufacturing thereof or the atomic ratio of Ni/Mg (providing that it is in the range of 0.5 to 5.0) may be, and particularly those wherein the content of the copper-chromium-manganese oxide in terms of metal is in the range of 5 to 20 wt.% — preferably 10 to 20 wt.% — relative to the content of nickel, are possessed of a conspicuous efficiency.

In this connection, for the purpose of facilitating understanding of the merits of the present invention, the reforming reaction shown in the present example was effected by deliberately controlling the conversion by means of employing a sulfur-rich naphtha and increasing the feed of material per unit amount of catalyst (even in this case, the initial conversion is 100%). Therefore, in the case where the conditions for reaction were so set as to make the conversion 100%, the product gas obtained from the same material naphtha as above was possessed of the following composition:

| | | | |
|---|---|---|---|
| $CH_4$: | 51.9 vol.% | $H_2$: | 27.3 vol.% |
| CO: | 1.1 vol.% | $CO_2$: | 19.7 vol.% |

EXAMPLE 2

The purpose of this example is to explain the efficiency of the catalysts belonging to the group M-2 of the present invention in comparison with that of the comparative catalysts belonging to the group S-1.

25 gr each of the catalysts belonging to the group M-2 and group S-1 were packed in separate reforming reactors and subjected to reduction treatment under the same conditions as in Example 1. Subsequently, by introducing the same naphtha feed material as in Example 1 at the rate of 80 gr/hr into said reactor(s) together with steam by setting the ratio of $H_2O/C$ (mole/atom) at 1.5, a series of tests of the efficiency in continuous steam reforming for 200 hours under the condition that 500° C in temperature for reaction and 20 $Kg/cm^2$.G in pressure for reaction were conducted. As a result of said tests, the relation between the content of copper-chromium-manganese oxide and the conversion in each catalyst was as shown in FIG. 2.

Further, when another series of steam reforming tests were conducted in the same way as above except for elevating the pressure for reaction from the foregoing 20 $Kg/cm^2$.G to 70 $Kg/cm^2$.G also by employing each catalyst of the groups M-2 and S-1, the result was as shown in FIG. 3 respectively.

Figure 2:
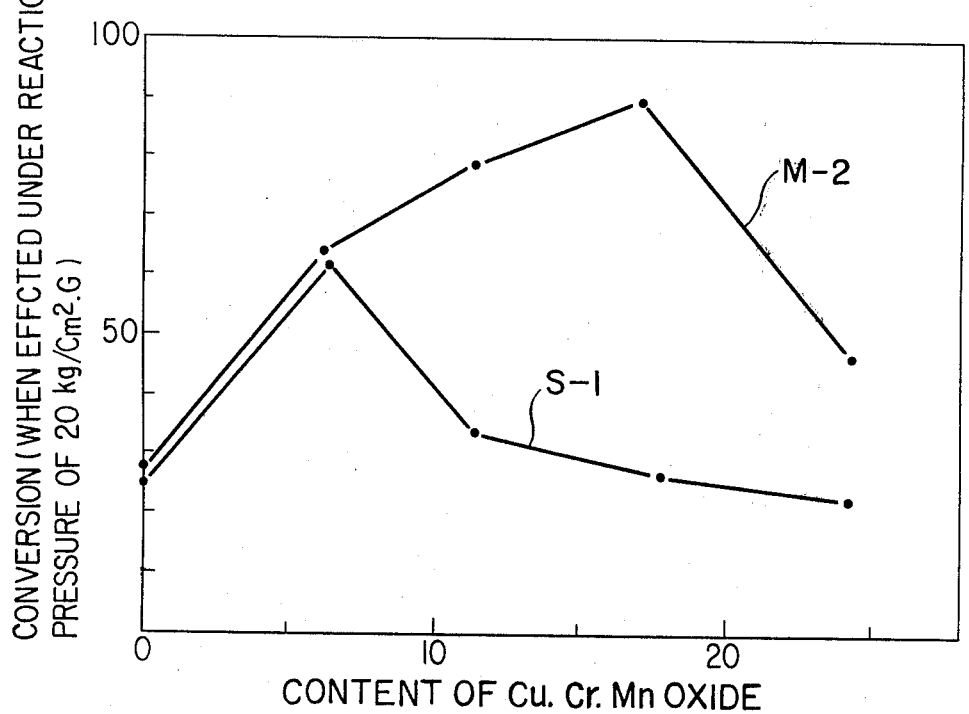

As is clear from FIG. 2, in the case where the content of copper-chromium-manganese oxide was less than 6 wt.%, the catalysts belonging to the group S-1 could demonstrate a conversion equivalent to that of the catalysts of the present invention when employed for steam reforming reaction under the condition of a relatively low pressure for reaction such as 20 $Kg/cm^2$.G, but with the increase of said content of oxide above 6 wt.%, the conversion went on decreasing, and particularly when said content increased above 10 wt.%, there was observed little effect of the presence of said oxide. On the other hand, on the occasion of effecting reforming reaction under the condition of a relatively high pressure such as 70 $Kg/cm^2$.G, as seen in FIG. 3, the catalysts of the present invention rendered a conversion almost equal to that under the condition of low pressure, while the catalysts of the group S-1 failed to demonstrate the effect of containing copper-chromium-manganese oxide therein. Consequently, the catalysts under the present invention can improve the conversion in the low-temperature steam reforming reaction both under the reaction condition of a relatively low pressure and under the reaction condition of a high pressure.

Further, in the case where the catalysts of the group M-2 were employed for the foregoing steam reforming test by setting the conditions for reaction so as to make the conversion 100%, the product gas was possessed of the following composition:

| | in case of applying pressure for reaction of 20 $Kg/cm^2$.G | in case of applying pressure for reaction of 70 $Kg/cm^2$.G |
|---|---|---|
| $CH_4$ | 61.7 vol.% | 67.7 vol.% |
| $H_2$ | 16.5 vol.% | 9.6 vol.% |
| CO | 0.9 vol.% | 0.5 vol.% |
| $CO_2$ | 20.9 vol.% | 22.2 vol.% |

EXAMPLE 3.

Upon preparing varieties of catalysts M'-2 and M'-3 by applying the same conditions for manufacturing as employed for the catalysts of the groups M-2 and M-3 in the foregoing Table-1, save for substituting a copper-chromium oxide for said copper-chromium-manganese oxide to be contained therein, the same steam reforming reaction as in Example 1 was effected by employing these catalysts. The relation between the content of copper-chromium oxide and the conversion in each catalyst was as shown in FIG. 4.

As seen in FIG. 4, in the case of employing the catalysts of the groups M'-2 and M'-3, as compared with the case of employing the catalysts of the groups M-2 and M-3 comprising a manganese component, the conversion shows a tendency to decrease in some measure, but these catalysts can still be demonstrate superior effects in low-temperature steam reforming reaction.

Next, 33 varieties of nickel-containing catalysts supported on carrier for use in the following Example 4 were prepared under the conditions for manufacturing shown in Table-3 below. As the carrier component, carrier materials having such properties as shown in the following table were applied.

| Carrier | Properties purity | specific surface area | grain size |
|---|---|---|---|
| $\alpha\text{-}Al_2O_3$ | 99% (commerical reagent) | 2.8 $m^2$/gr | less than 200 meshes |
| SiC | 90% (electrically fused product) | 1.0 " | " |
| $\alpha$-quartz | more than 99% | 2.0 " | " |

-continued

| Carrier | Properties purity | specific surface area | grain size |
|---|---|---|---|
| $ZrO_2$ | commercial reagent calcined at 1,500° C for 20 hrs. | 3.6 " | " |
| γ-$Al_2O_3$ | 99% (commercial) (reagent) | 190 " | " |
| $SiO_2$ gel | 99.5% (") | 600 " | " |

Further, in said Table-3, the catalysts belonging to the groups N-1, N-2 and N-3 are catalysts manufactured in the same way as in the case of the catalyst d of the group M-1, catalyst c of the group M-5 and catalyst d of the group M-6 shown in Table-1 in Example 1 above except that the contain said carrier components.

Table 3

| symbol for catalyst | | Condition for manufacturing atomic ratio of Ni/Mg | content of copper-chromium-manganese oxide (Cu:Cr:Mn= 1:1:0.1) (wt.%) | carrier component | content of carrier (wt.%) |
|---|---|---|---|---|---|
| | a | | | | 10 |
| | b | | | | 30 |
| | c | | | α-quartz | 50 |
| | d | | | | 70 |
| | e | | | | 80 |
| | f | | | | 50 |
| | g | | | SiC | 70 |
| | h | | | | 80 |
| | i | | | | 50 |
| N-1 | j | 0.6 | 17 | $ZrO_2$ | 70 |
| | k | | | | 80 |
| | l | | | | 10 |
| | m | | | | 30 |
| | n | | | α-$Al_2O_3$ | 50 |
| | o | | | | 70 |
| | p | | | | 80 |
| | q | | | γ-$Al_2O_3$ | 50 |
| | r | | | silica gel | 30 |
| | s | | | | 50 |
| | a | | | | 30 |
| | b | | | α-quartz | 70 |
| N-2 | c | 1.7 | 11 | | 80 |
| | d | | | SiC | 30 |
| | e | | | γ-$Al_2O_3$ | 30 |
| | a | | | α-quartz | 50 |
| | b | | | | 80 |
| | c | | | SiC | 50 |
| | d | | | | 80 |
| N-3 | e | 1.7 | 17 | $ZrO_2$ | 70 |
| | f | | | | 80 |
| | g | | | α-$Al_2O_3$ | 70 |
| | h | | | | 80 |
| | i | | | silica gel | 50 |

EXAMPLE 4.

Figure 5:
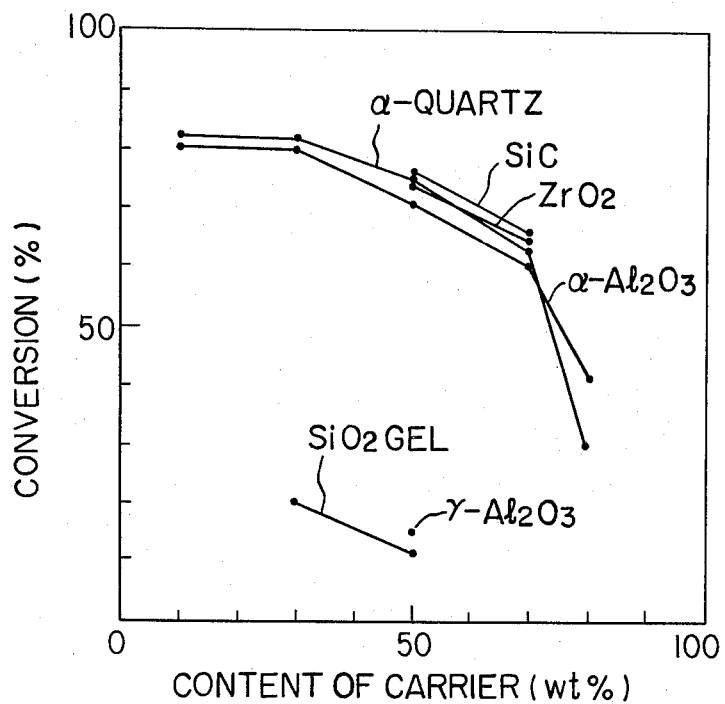
Figure 6:
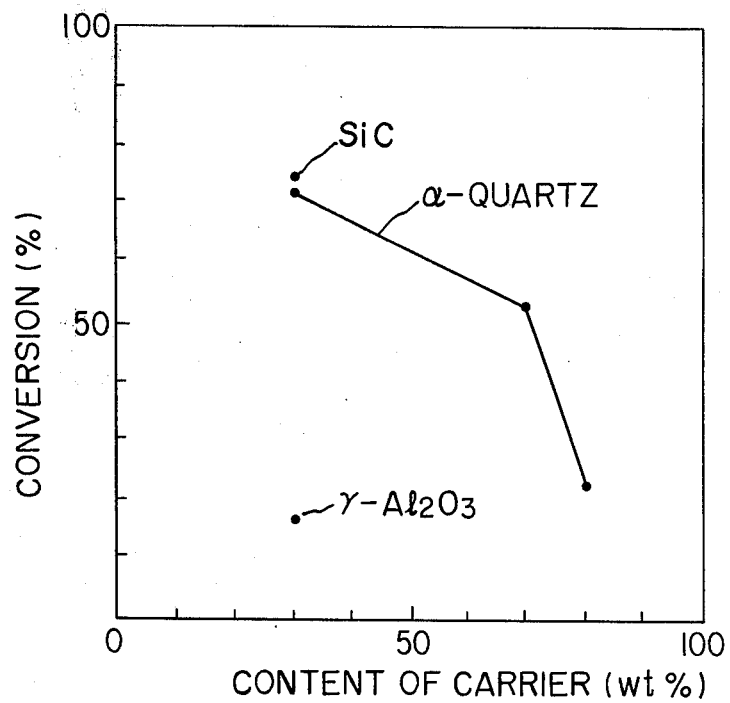
Figure 7:
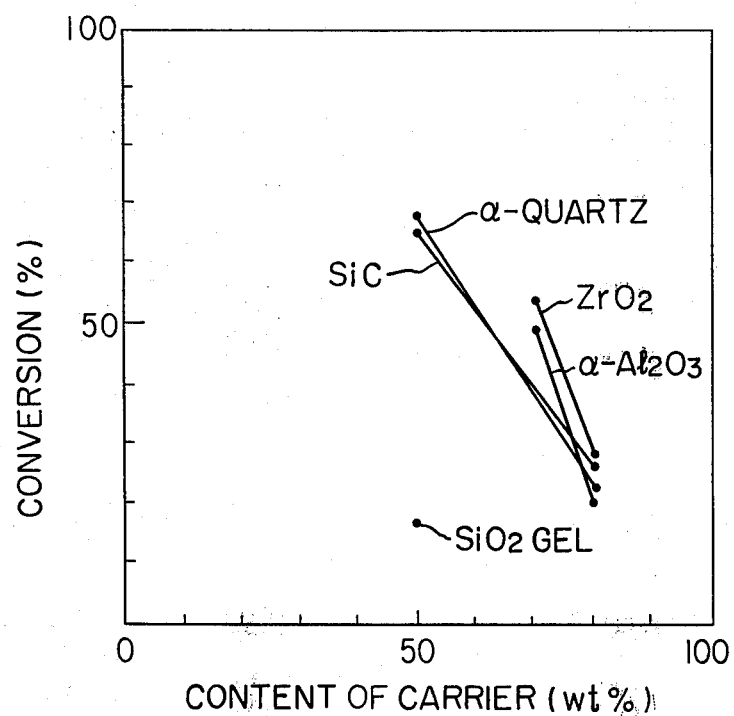

25 gr each of the catalysts belonging to the groups N-1, N-2 and N-3 shown in Table-3 above were packed in separate reforming reactors and subjected to reduction treatment under the same conditions as in Example 1. Subsequently, by introducing the same naptha red material as in Example 1 at the rate of 80 gr/hr into said reactors(s) together with steam by setting the ratio of $H_2O$/C (mole/atom) at 1.5, a series of tests of the efficiency in ontinuous steam reforming for 200 hours under the condition that 500° C in temperature for reaction and 70 Kg/cm$^2$.G in pressure for reaction were conducted. The result of said tests were as shown in FIG. 5 and FIG. 7. FIG. 5, FIG. 6 and FIG. 7 show the conversion in the case of employing the catalysts belonging to the group N-1, group N-2 and group N-3, respectively.

Further, when each catalyst after completion of said test was pulverized into a powder having a particle size of 50–100 μ, 10 gr of said powder were suspended by stirring in 500 cc of water, $CO_2$ gas of 60 mm-aq. was introduced into the resulting suspension for 2 hours to effuse MgO therein and the weight of the thus effused MgO was measured, in the case of those catalysts employing the conventional carrier such as γ-$Al_2O_3$ and silica gel as the carrier component, the amount of MgO effused was very small, while in the case of those catalysts employing the aforesaid carrier under the present invention, there was observed effusion of more than about 80% of MgO contained therein. As to the reason for such a wide difference of the MgO effusion ratio, it is likely that the catalysts comprising a conventional carrier have caused chemical reaction between MgO and said carrier component during the reforming reaction.

As is clear from the foregoing results of measurements too, the catalysts comprising a carrier component according to the present invention have proved to be possessed of excellent properties, and, at the same time, it will be readily understood from FIG. 5 through FIG. 7 that the catalysts wherein this carrier component is contained in excess of 70 wt.% relative to the whole amount of catalyst are unfit for use in the low-temperature steam reforming reaction according to the present invention.

Furthermore, for the purpose of facilitating understanding of the merits of the present invention, the reforming reaction described in the present example was effected by deliberately controlling the conversion by means of employing a sulfur-rich naphtha as the material hydrocarbon and increasing the feed of material per unit amount of catalyst (even in this case, the initial conversion is 100%). Therefore, in the case where the conditions for reaction were so set as to make the conversion 100%, the product gas obtained from the same material naphtha as above was possessed of the following composition:

| $CH_4$: | 67.7 vol.% | $H_2$: | 9.6 vol.% |
|---|---|---|---|
| CO : | 0.5 vol.% | $CO_2$: | 22.2 vol.% |

What is claimed is:

1. In a process for manufacturing a methane-containing gas by subjecting steam-reformable feed hydrocarbons to adiabatic low-temperature steam reforming in the presence of a nickel catalyst, the improvement which comprises preheating a mixture of said feed hydrocarbon with steam, mixed in the ratio of moles of steam to the number of moles of carbon atoms in said feed hydrocarbon in the range of 0.9 to 5.0, to a temperature in the range of 250° to 600° C, feeding the preheated mixture into a steam reforming reaction zone containing a catalyst composition consisting essentially of (A) Ni—NiO—MgO or Ni—MgO, in which the atomic ratio of Ni/Mg is in the range of 0.5 to 5.0, (B) a member selected from the group consisting of Cu—Cr in oxide form and Cu—Cr—Mn in oxide form, the amount of component (B), calculated as the metals, being from 10 to 25 wt.% based on the nickel content, calculated as nickel metal, of component (A), and (C) up to 70 percent by weight, based on the combined weights of (A), (B) and (C), of a carrier substan selected from the group consisting of α-Al₂O₃, SiC, α-quartz and calcined ZrO₂ calcined at 1500° C for 20 hours, and effecting steam reforming of said feed hydrocarbons by maintaining the temperature of the said catalyst in the range of 300° to 600° C and the pressure of the reaction zone in the range of 10 to 100 kg/cm²G.

2. A process according to claim 1, in which the amount of catalyst component (B) calculated as the metals is from 10 to 20 wt.%, based on the nickel content, calculated as nickel metal, of component (A), the pressure of the reaction zone is in the range of 30 to 100 kg/cm².G, and the temperature of the catalyst is in the range of 400° to 570° C.

3. A process according to claim 2, in which the amount of catalyst component (C) is from 10 to 70 percent by weight, based on the combined weights of (A), (B) and (C).

4. A process according to claim 1, in which said hydrocarbon is selected from the group consisting of refinery off gas, LPG, light naphtha, heavy naphtha and kerosene.

5. A process according to claim 1, in which in component (B), the atomic ratio of Cu—Cr is 1:1, and the atomic ratio of Cu—Cr—Mn is 1:1:0.1.

6. A process according to claim 1, in which said catalyst has been calcined at 300°–800° C and has been reduced by contact with hydrogen at 300° to 600° C.

7. A process as claimed in claim 3 in which said catalyst component (C) is SiC.

8. A process as claimed in claim 3 in which said catalyst component (C) is α-quartz.

9. A process according to claim 1 in which the atomic ratio of Ni/Mg in the nickel-magnesia component (A) is in the range of 1.0 to 3.0.

10. A process according to claim 1 which is characterized in that the amount of catalyst component (B) or copper-chromium-manganese oxide is in the range of 10–20 wt.% in terms of metal relative to the content of nickel metal of component (A).

* * * * *

UNITED STATES PATENT AND TRADEMARK OFFICE
CERTIFICATE OF CORRECTION

PATENT NO. : 4 000 987
DATED : January 4, 1977
INVENTOR(S) : Akio Okagami, Kunihiko Uemoto and Kouichi Satoh It is certified that error appears in the above–identified patent and that said Letters Patent are hereby corrected as shown below:

Column 14, line 17; after "(B)" delete "or".

line 18; delete "copper-chromium-manganese oxide".

Signed and Sealed this

Twenty-sixth Day of April 1977

[SEAL]

Attest:

RUTH C. MASON
*Attesting Officer*

C. MARSHALL DANN
*Commissioner of Patents and Trademarks*